United States Patent

Toyama

Patent Number: 6,075,654
Date of Patent: Jun. 13, 2000

[54] THREE-GROUP ZOOM LENS

[75] Inventor: Nobuaki Toyama, Omiya, Japan

[73] Assignee: Fuji Photo Optical Co., Ltd., Omiya, Japan

[21] Appl. No.: 09/342,108

[22] Filed: Jun. 29, 1999

[30] Foreign Application Priority Data

Jul. 7, 1998 [JP] Japan .................................. 10-191757

[51] Int. Cl.⁷ .................................................. G02B 15/14
[52] U.S. Cl. ........................................................... 359/689
[58] Field of Search .................................. 359/689, 683, 359/676, 677

[56] References Cited

U.S. PATENT DOCUMENTS 5,572,365  11/1996  Ito ........................................... 359/689

FOREIGN PATENT DOCUMENTS 8-43737  2/1996  Japan .

Primary Examiner—Scott J. Sugarman
Attorney, Agent, or Firm—Arnold International; Bruce Y. Arnold

[57] ABSTRACT

A zoom lens having three lens groups I, II, and III, in order from the object side, of positive, positive and negative refractive power, respectively, is made to have a simple drive mechanism which shifts the first lens group and the third lens group as one unit when power is varied. A diaphragm 2 is arranged nearest the image-side surface of the first lens group. When shifting from the wide-angle end to the telephoto end, each lens group is shifted so as to increase the spacing between the first lens group and the second lens group and to decrease the spacing between the second lens group and the third lens group. By making one or more surfaces in the second lens group and the third lens group aspheric, the three-group zoom lens can be made compact and various aberrations can be favorably corrected.

4 Claims, 5 Drawing Sheets

Embodiment 1

Embodiment 3

Wide-angle End

Telephoto End

THREE-GROUP ZOOM LENS

BACKGROUND OF THE INVENTION

A zoom lens of high variable power recently became available in lens shutter cameras, and a zoom lens having a variable power of three-times or more has been particularly desired. As such a zoom lens, the one disclosed in Japanese Laid-Open Patent Application H8-43737 is well known. According to this zoom lens, an F-number at the wide-angle end can be as low as 4.6, thereby yielding a relatively bright image. In addition, favorable correction of aberrations is achieved.

However, the zoom lens of the above-noted laid-open patent application has four lens groups, and there has been a problem in that the configuration of the lens drive mechanism is complex, since power is varied by changing the spacings between each of the four lens groups. Therefore, a zoom lens has been desired that has a more simple and compact lens drive mechanism, a wide angle of view at the wide-angle end, a short overall length, and wherein the lens has excellent imaging properties.

BRIEF SUMMARY OF THE INVENTION

The present invention is a zoom lens that is suitable for lens shutter cameras, video cameras, and the like. More particularly the present invention is a three-group zoom lens that achieves a variable power of three-times or more.

A first object of the invention is to provide a three-group zoom lens having a simple and inexpensive lens drive mechanism. A second object of the invention is to provide a three-group zoom lens that has a wide angle of view at the wide-angle end. A third object of the invention is to provide a zoom lens that has a bright image. A fourth object of the invention is to provide a zoom lens that has a shorter overall length at the telephoto end than previously available. A fifth object of the invention is to provide a zoom lens that favorably corrects aberrations over the entire viewing range, from infinity to nearby, so that the image has a high resolution and a high contrast. The present invention meets all of these goals and provides a three-group zoom lens that has an image angle $2\omega$ at the wide-angle end of 70 degrees or more, an F-number at the telephoto end of 10 or less, and a variable power ratio of 3.6 or more.

BRIEF DESCRIPTION OF THE DRAWINGS

The present invention will become more fully understood from the detailed description given below and the accompanying drawings, which are given by way of illustration only and thus are not limitative, and wherein.

DETAILED DESCRIPTION

The three-group zoom lens of the present invention includes, in order from the object side, a first lens group of a positive refractive power, a second lens group of a positive refractive power, and a third lens group of a negative refractive power. Power is varied by changing the spacing between each of these lens groups. A diaphragm is positioned nearest the image surface side of the first lens group, and the first lens group and the third lens group are shifted as one body when power is varied. When shifting from the wide-angle end to the telephoto end, each lens group is shifted so as to increase the spacing between the first lens group and the second lens group and to decrease the spacing between the second lens group and the third lens group. It is preferred that the third lens group include a lens element having at least one aspherical surface, and that the following Condition (1) is satisfied:

$-0.75 < R_{G21}/fw < -0.20$  Condition (1)

where $R_{G21}$ is the radius of curvature of the lens element surface of the second lens group nearest the object side; and fw is the focal length of the zoom lens at the wide-angle end.

Condition (1) ensures correction of coma and curvature of field. When either the upper limit or the lower limit is not met, coma or curvature of field increases and becomes difficult to correct.

It is also preferable that the lens element surface of the second lens group nearest the image side be aspherical. Furthermore, it is preferred that the second lens group be constructed as follows, in order from the object side: a meniscus lens element of negative refractive power with its concave surface on the object side; a biconvex lens element, a lens element of negative refractive power, and a lens element of positive refractive power.

Figure 1:
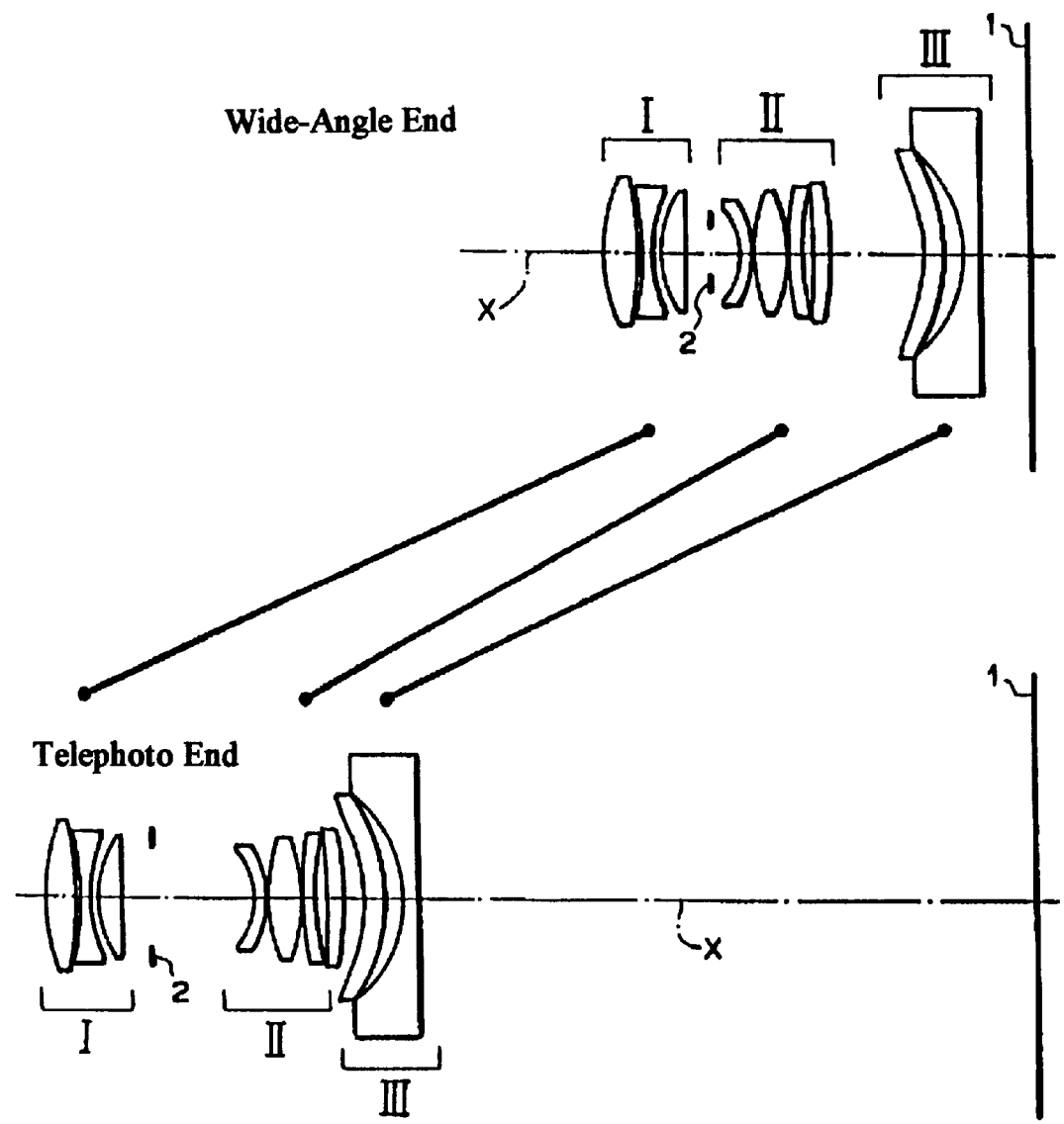
FIG. 1 shows the basic lens element construction and group positions at the wide-angle end and the telephoto end for the lens of Embodiment 1.

FIG. 1 illustrates the basis lens element construction for each embodiment of the invention, at both the wide-angle end and the telephoto end. The lens element construction of Embodiments 1–3 is a follows, in order from the object side: a first lens group I of positive refractive power, a second lens group II of positive refractive power and a third lens group III of negative refractive power. The first lens group I and the third lens group III are shifted as one body when power is varied. Further, when shifting from the wide-angle end to the telephoto end, each of the three lens groups is shifted so as to increase the spacing between the first lens group I and the second lens group II and to decrease the spacing between the second lens group II and the third lens group III.

Three embodiments of the present invention will now be discussed with reference to drawings.

Embodiment 1

Figure 2:
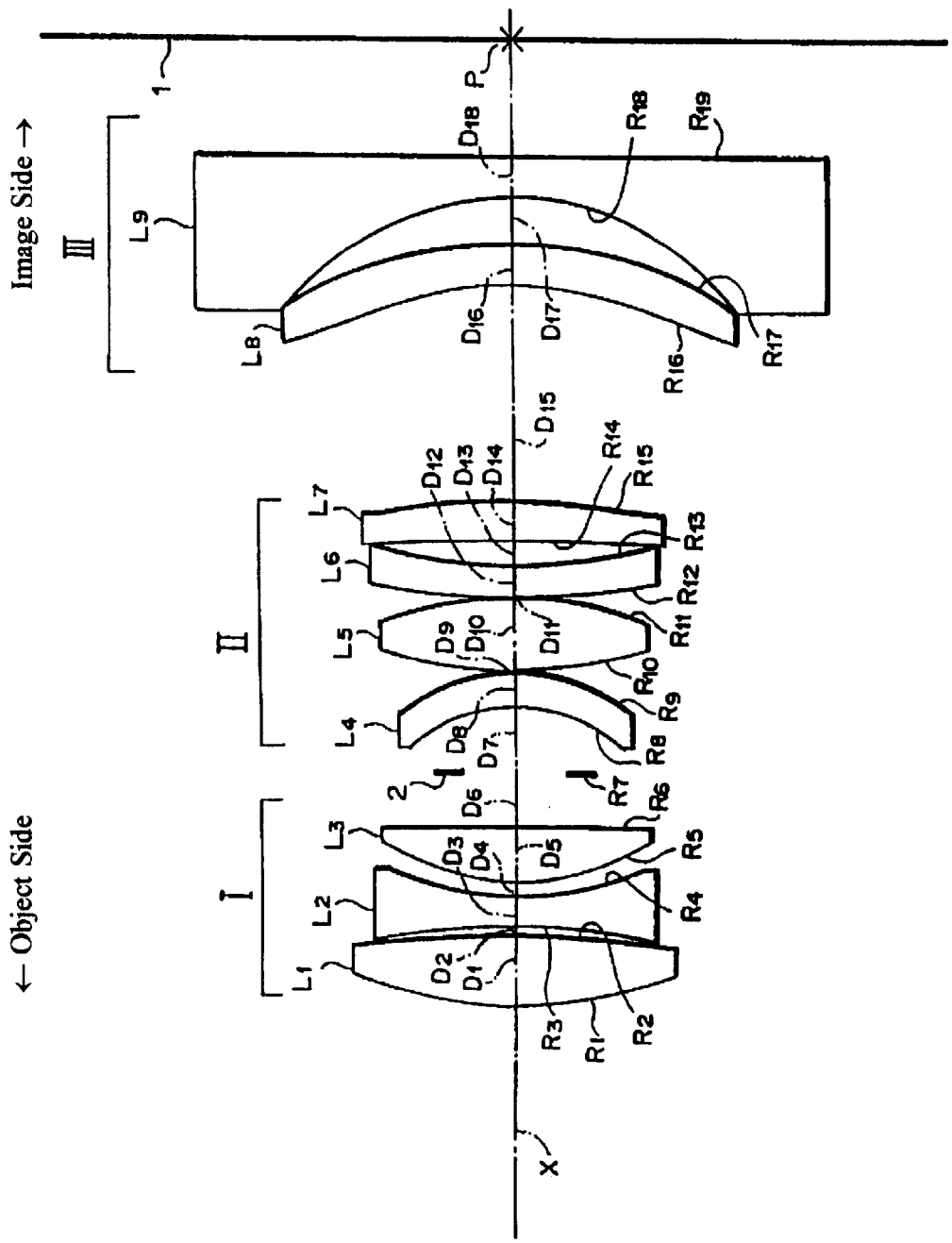
FIG. 2 shows an enlarged view of the basic lens element construction and group positions at the wide-angle end for the lens of Embodiment 1.

As best illustrated in FIG. 2, which shows the lens element structure of FIG. 1 in greater detail, the first lens group I includes, in order from the object side: a first lens element $L_1$ that is biconvex, a second lens element $L_2$ that is biconcave, and a third lens element $L_3$ which has a positive meniscus shape with its convex surface on the object side. Moreover, a diaphragm 2 which moves as a unit with the first lens group I is arranged nearest the image-surface side of the first lens group I.

The second lens group II includes, in order from the object side: a fourth lens element $L_4$ which has a negative meniscus shape with its concave surface on the object side, a fifth lens element $L_5$ that is biconvex, a sixth lens element $L_6$ which has a negative meniscus shape with its convex surface on the object side, and a seventh lens element $L_7$ which has a positive meniscus shape with its concave surface on the object side. Various aberrations, particularly spherical aberration and coma, can be favorable corrected by applying such a lens element configuration to the second lens group II.

The third lens group $G_3$ includes, in order from the object side: an eighth lens element $L_8$ which has a negative meniscus shape with its concave surface on the object side, and a ninth lens element $L_9$ that is plano-concave with its concave surface on the object side. Moreover, both surfaces of the seventh lens element $L_7$ (#14 and #15) and both surfaces of the eighth lens element $L_8$ (#16 and #17) are aspherical, enabling various aberrations to be made acceptably small.

The first lens group I and the third lens group III shift as one body when power is varied so that the drive mechanism of these lens groups is simple. Furthermore, both zooming and focusing of the second lens group II can be carried out by the feeding mechanism of the diaphragm 2. Thus, manufacturing is simple, and costs can be reduced. With the above-noted lens element configuration of this embodiment, various aberrations for object distances from infinity to nearby are favorably corrected so as to yield a high quality image. In this manner the zoom lens efficiently collects luminous flux and forms an image on an imaging surface 1 located at position P along the optical axis X.

Table 1, below, lists the surface # in order from the object side, the radius of curvature R near the optical axis (in mm) of each lens element surface, the on-axis surface spacing D (in mm), as well as the index of refraction $N_d$, and the Abbe constant $v_d$ (at the d-line) for each lens element of Embodiment 1. In the middle portion of the table are given the range of focal length f and Fno. from the wide-angle end to the telephoto end. In the bottom portion of the table, the spacing $D_7$ between the diaphragm 2 and the second lens group II, and the spacing $D_{15}$ between the second lens group II and the third lens group III are given for the wide-angle end (WIDE) and the telephoto end (TELE).

TABLE 1

| # | R | D | $N_d$ | $v_d$ |
|---|---|---|---|---|
| 1 | 15.238 | 2.37 | 1.54977 | 45.7 |
| 2 | −43.248 | 0.28 | | |
| 3 | −26.630 | 1.00 | 1.83400 | 44.6 |
| 4 | 11.946 | 0.48 | | |
| 5 | 8.516 | 1.88 | 1.48749 | 70.4 |
| 6 | 1004.965 | 2.00 | | |
| 7 | ∞ | $D_7$ | | |
| 8 | −5.500 | 1.00 | 1.55990 | 62.7 |
| 9 | −6.949 | 0.10 | | |
| 10 | 14.861 | 2.49 | 1.48749 | 70.4 |
| 11 | −13.653 | 0.10 | | |
| 12 | 33.108 | 1.00 | 1.83400 | 28.1 |
| 13 | 18.773 | 0.84 | | |
| 14* | −147.781 | 1.34 | 1.77878 | 28.9 |
| 15* | −23.762 | $D_{15}$ | | |
| 16* | −11.002 | 1.40 | 1.49023 | 57.5 |
| 17* | −17.215 | 1.60 | | |
| 18 | −9.896 | 1.30 | 1.67591 | 57.7 |
| 19 | ∞ | | | | f = 23.30–87.19   Fno. = 5.7–9.9

| | WIDE | TELE |
|---|---|---|
| $D_7$ | 2.245 | 7.898 |
| $D_{15}$ | 7.251 | 1.598 |

The calculated value $R_{G21}/fw$ in Condition (1) above is −0.24. Thus, Condition (1) is satisfied. In addition, the image angle $2\omega$ is 73.8° at the wide-angle end.

Those surfaces with a * to the right of the surface number in Table 1 are aspherical surfaces, and the aspherical surface shape is expressed by Equation (A) below.

$$Z = Ch^2/\{1+(1-KC^2h^2)^{1/2}\} + a_4h^4 + a_6h^6 + a_8h^8 + a_{10}h^{10} \quad \text{(Equation A)}$$

where

Z is the length (in mm) of a line drawn from a point on the aspherical surface at distance Y from the optical axis to the tangential plane of the aspherical surface vertex, C (=1/R) is the curvature of the aspherical surface near the optical axis, h is the distance (in mm) from the optical axis, K is the eccentricity, and $a_4$, $a_6$, $a_8$, and $a_{10}$ are the 4th, 6th, 8th, and 10th aspherical coefficients.

The values of each of the constants K and $a_4$–$a_{10}$ of the aspherical surfaces indicated in Table 1 are shown in Table 2.

TABLE 2

| # | K | $a_4$ | $a_6$ | $a_8$ | $a_{10}$ |
|---|---|---|---|---|---|
| 14 | 1.0071544 | −0.7383967 × 10⁻⁴ | −0.6444249 × 10⁻⁶ | −0.4475090 × 10⁻⁸ | −0.2929433 × 10⁻¹⁰ |
| 15 | 0.4696308 | 0.8646637 × 10⁻⁴ | 0.8998290 × 10⁻⁶ | 0.6119405 × 10⁻⁸ | 0.3208212 × 10⁻¹⁰ |
| 16 | −1.4509851 | 0.6858445 × 10⁻⁴ | 0.4413023 × 10⁻⁶ | 0.1518316 × 10⁻⁹ | 0.1875292 × 10⁻¹⁰ |
| 17 | 1.9779295 | −0.1696209 × 10⁻⁴ | −0.9580998 × 10⁻⁶ | −0.3717931 × 10⁻⁸ | 0.8695185 × 10⁻¹⁰ |

Embodiment 2

The three-group zoom lens of Embodiment 2 has roughly the same lens element configuration as that of Embodiment 1, but is different in that the first lens element $L_1$ has a positive meniscus shape with its convex surface on the object side, the second lens element $L_2$ has a negative meniscus shape with its concave surface on the object side, and the seventh lens element $L_7$ is a biconvex lens.

Table 3, below, lists the surface # in order from the object side, the radius of curvature R near the optical axis (in mm) of each lens element surface, the on-axis surface spacing D (in mm), as well as the index of refraction $N_d$, and the Abbe constant $v_d$ (at the d-line) for each lens element of Embodiment 2. In the middle portion of the table are given the range of focal length f and Fno. from the wide-angle end to the telephoto end. In the bottom portion of the table, the spacing $D_7$ between the diaphragm 2 and the second lens group II and the spacing $D_{15}$ between the second lens group II and the third lens group III are given for the wide-angle end (WIDE) and the telephoto end (TELE).

TABLE 3

| # | R | D | $N_d$ | $v_d$ |
|---|---|---|---|---|
| 1 | 33.949 | 1.25 | 1.57462 | 41.0 |
| 2 | 60.539 | 0.89 | | |
| 3 | −24.124 | 1.20 | 1.83400 | 38.0 |
| 4 | −314.036 | 0.10 | | |
| 5 | 12.742 | 3.13 | 1.48749 | 70.4 |
| 6 | 500.956 | 2.00 | | |
| 7 | ∞ | $D_7$ | | |
| 8 | −15.000 | 1.00 | 1.69814 | 56.6 |
| 9 | −27.729 | 0.10 | | |
| 10 | 12.970 | 1.72 | 1.48749 | 70.4 |
| 11 | −77.670 | 1.84 | | |
| 12 | 19.243 | 1.00 | 1.83400 | 23.3 |
| 13 | 13.276 | 0.46 | | |
| 14* | 23.780 | 1.92 | 1.63915 | 34.3 |
| 15* | −24.707 | $D_{15}$ | | |
| 16* | −8.136 | 1.40 | 1.49023 | 57.5 |
| 17* | −12.175 | 0.20 | | |
| 18 | −10.765 | 1.30 | 1.65980 | 58.5 |
| 19 | ∞ | | | | f = 23.58–91.08  Fno. = 5.7–9.9

| | WIDE | TELE |
|---|---|---|
| $D_7$ | 1.215 | 7.487 |
| $D_{15}$ | 7.771 | 1.499 |

The value of $R_{G21}/fw$ for this Embodiment is −0.65, satisfying Condition (1). In addition, the image angle $2\omega$ at the wide-angle end is 73.8°.

Those surfaces with a * to the right of the surface number in Table 3 are aspherical surfaces, and the aspherical surface shape is expressed by Equation (A) above. The values of each of the constants K and $a_4$–$a_{10}$ of the aspherical surfaces indicated in Table 3 are shown in Table 4.

Embodiment 3

The three-group zoom lens of Embodiment 3 has roughly the same lens configuration as the one in Embodiment 1, but is different in that the third lens element $L_3$ is a biconvex lens having different surface powers with the surface of larger curvature on the object side and the seventh lens element $L_7$ is a biconvex lens having different surface powers with the surface of larger curvature on the image side.

Table 5, below, lists the surface # in order from the object side, the radius of curvature R near the optical axis (in mm) of each lens element surface, the on-axis surface spacing D (in mm), as well as the index of refraction $N_d$, and the Abbe constant $v_d$ (at the d-line) for each lens element of Embodiment 3. In the middle portion of the table are given the range of focal length f and Fno. from the wide-angle end to the telephoto end. In the bottom portion of the table, the spacing $D_7$ between the diaphragm 2 and the second lens group II and the spacing $D_{15}$ between the second lens group II and the third lens group III are given for the wide-angle end (WIDE) and the telephoto end (TELE).

TABLE 5

| # | R | D | $N_d$ | $v_d$ |
|---|---|---|---|---|
| 1 | 24.737 | 1.81 | 1.61713 | 36.3 |
| 2 | −78.544 | 0.43 | | |
| 3 | −26.535 | 1.20 | 1.83399 | 39.6 |
| 4 | 20.140 | 0.10 | | |
| 5 | 10.349 | 2.55 | 1.48749 | 70.4 |
| 6 | −111.277 | 2.00 | | |
| 7 | ∞ | $D_7$ | | |
| 8 | −6.934 | 1.00 | 1.49313 | 65.3 |
| 9 | −10.401 | 0.10 | | |
| 10 | 16.401 | 2.00 | 1.48749 | 70.4 |
| 11 | −18.972 | 0.10 | | |
| 12 | 27.953 | 1.00 | 1.83400 | 23.3 |
| 13 | 16.489 | 0.70 | | |
| 14* | 646.702 | 1.74 | 1.66772 | 32.3 |
| 15* | −15.366 | $D_{15}$ | | |
| 16* | −10.322 | 1.40 | 1.49023 | 57.5 |
| 17* | −15.072 | 1.56 | | |
| 18 | −9.548 | 1.30 | 1.63761 | 59.6 |
| 19 | ∞ | | | | f = 23.58–91.00  Fno. = 5.7–9.9

| | WIDE | TELE |
|---|---|---|
| $D_7$ | 1.807 | 7.758 |
| $D_{15}$ | 7.449 | 1.498 |

Condition (1) is satisfied, in that the value of $R_{G21}/fw$ is −0.30. In addition, the image angle $2\omega$ at the wide-angle end is 73.8°.

Those surfaces with a * to the right of the surface number in Table 5 are aspherical surfaces, and the aspherical surface shape is expressed by Equation (A) above. The values of each of the constants K and $a_4$–$a_{10}$ of the aspherical surfaces indicated in Table 5 are shown in Table 6.

TABLE 4

| # | K | $a_4$ | $a_6$ | $a_8$ | $a_{10}$ |
|---|---|---|---|---|---|
| 14 | 1.0024559 | −0.4698024 × $10^{-4}$ | −0.4017274 × $10^{-6}$ | −0.7777721 × $10^{-8}$ | −0.1773247 × $10^{-9}$ |
| 15 | 0.4733642 | 0.9636409 × $10^{-4}$ | 0.4459210 × $10^{-6}$ | 0.5504593 × $10^{-8}$ | 0.1806336 × $10^{-9}$ |
| 16 | −0.2573678 | 0.2272877 × $10^{-4}$ | 0.4988370 × $10^{-7}$ | 0.2458134 × $10^{-8}$ | −0.3671636 × $10^{-12}$ |
| 17 | 1.6945834 | 0.9168558 × $10^{-5}$ | −0.8728985 × $10^{-7}$ | −0.7295418 × $10^{-8}$ | 0.7104474 × $10^{-10}$ |

TABLE 6

| # | K | $a_4$ | $a_6$ | $a_8$ | $a_{10}$ |
|---|---|---|---|---|---|
| 14 | 1.0071121 | $-0.5728295 \times 10^{-4}$ | $-0.3671467 \times 10^{-6}$ | $-0.3567370 \times 10^{-8}$ | $-0.3950692 \times 10^{-10}$ |
| 15 | 0.5287844 | $0.7899837 \times 10^{-4}$ | $0.4097778 \times 10^{-6}$ | $0.4680953 \times 10^{-8}$ | $0.5809680 \times 10^{-10}$ |
| 16 | -1.0167550 | $0.5669092 \times 10^{-4}$ | $0.6456437 \times 10^{-6}$ | $0.2976102 \times 10^{-8}$ | $0.2006505 \times 10^{-10}$ |
| 17 | 1.8005471 | $-0.6358267 \times 10^{-5}$ | $-0.5801036 \times 10^{-6}$ | $-0.8519794 \times 10^{-9}$ | $0.4723598 \times 10^{-10}$ |

Figure 3:
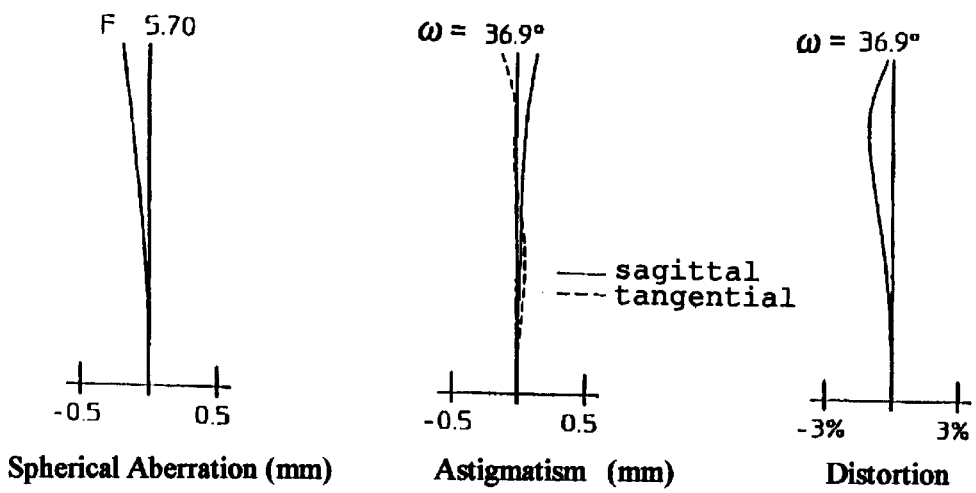
FIG. 3 shows the spherical aberration, astigmatism, and distortion for the lens of Embodiment 1 at both the wide-angle end and the telephoto end.
Figure 3:
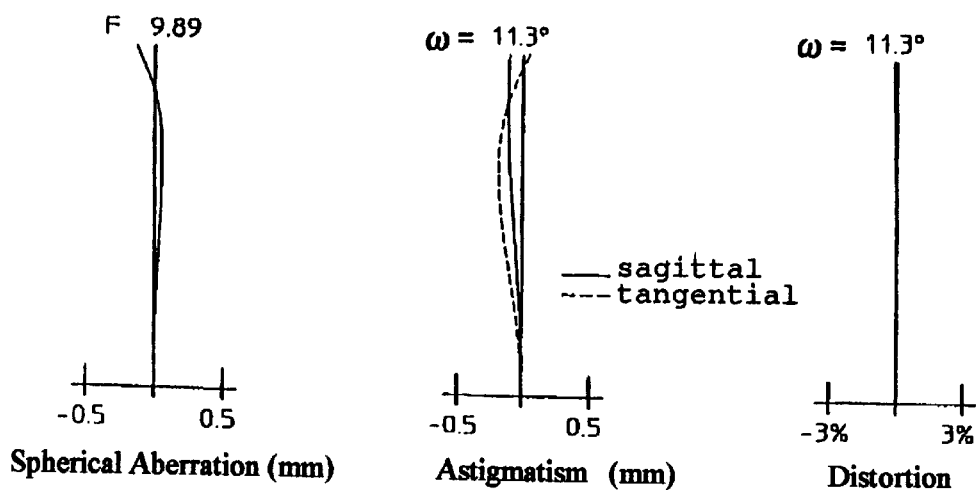
Figure 4:
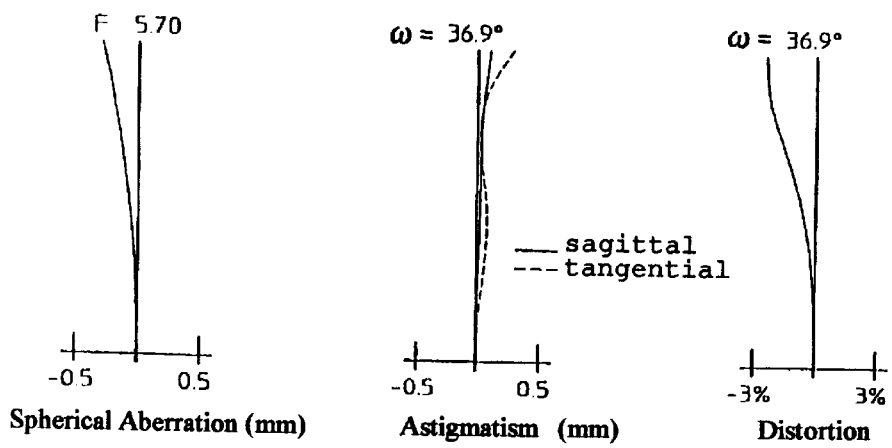
FIG. 4 shows the spherical aberration, astigmatism, and distortion for the lens of Embodiment 2 at both the wide-angle end and the telephoto end.
Figure 4:
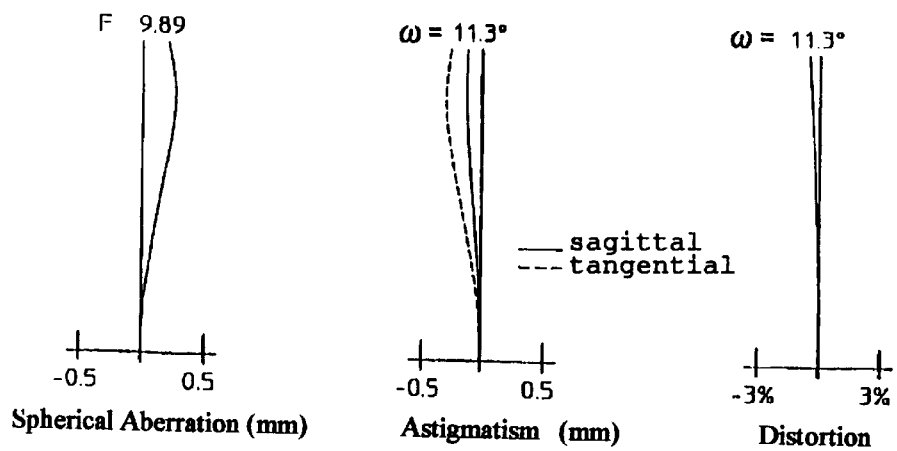
Figure 5:
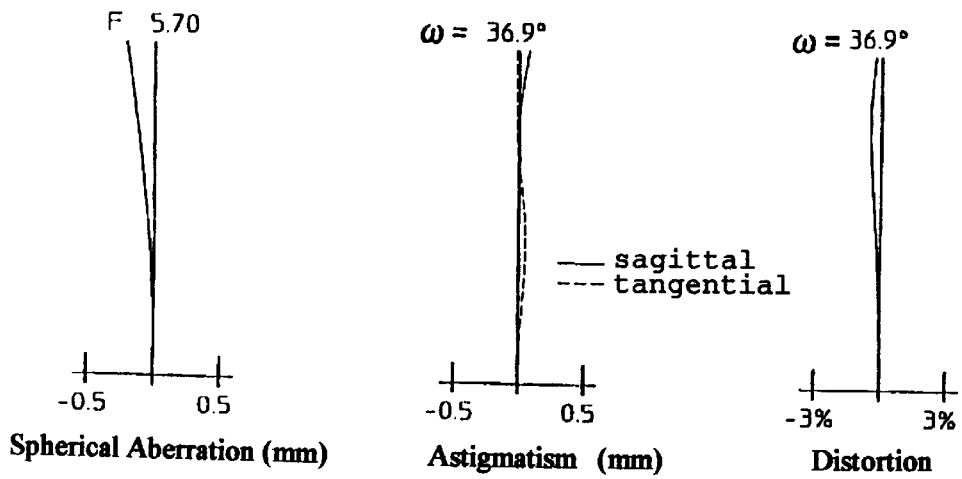
FIG. 5 shows the spherical aberration, astigmatism, and distortion for the lens of Embodiment 3 at both the wide-angle end and the telephoto end.
Figure 5:
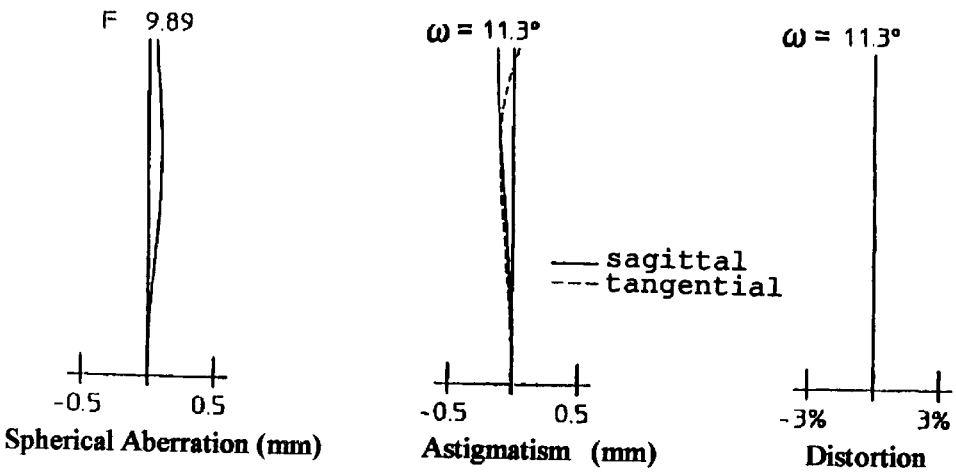

FIGS. 3, 4 and 5 illustrate the spherical aberration, astigmatism and distortion at the wide-angle end and at the telephoto end for Embodiments 1–3, respectively. The astigmatism is illustrated in both the sagittal and tangential image planes. As is clearly shown, each aberration is favorably corrected. Moreover, each embodiment provides a zoom lens with an image angle 2ω of 70 degrees or greater at the wide-angle end, an F-number of 10 or less at the telephoto end, and a variable power ratio of 3.6 or more.

In addition, the three-group zoom lens of the present invention is not limited to those in the above-mentioned embodiments; for example, the shape, the number of aspherical surfaces, and the shape of the aspherical surfaces of the lens elements making up each lens group can be appropriately selected.

In accordance with the three-group zoom lens of the present invention, a zoom lens system which is compact and consists of three groups can be provided; the angle of view is wide and a total length of the zoom lens at the telephoto end is shortened; moreover, imaging with high resolution and high contrast can be provided for object distances from infinity to nearby.

In addition, the first lens group and third lens group move as one unit when power is varied, so that the lens drive mechanism is simplified and manufacturing costs are lowered. Furthermore, by making one or more surfaces in the second lens group and the third lens group aspheric, the three-group zoom lens can be made compact and various aberrations can be favorably corrected.

The invention being thus described, it will be obvious that the same may be varied in many ways. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A three-group zoom lens comprising, in order from the object side:

a first lens group of positive refractive power;

a diaphragm positioned nearest the imaging surface side of said first lens group;

a second lens group of positive refractive power; and a third lens group of negative refractive power;

wherein when power is varied by shifting from the wide-angle end to the telephoto end, the first lens group and the third lens group are shifted as one body, the spacing between the first lens group and the second lens group is increased and the spacing between the second lens group and the third lens group is decreased, and the second lens group comprises, in order from the object side: a meniscus lens element of negative refractive power with its concave surface on the object side, a positive lens element that is biconvex, a lens element of negative refractive power, and a lens element of positive refractive power.

2. The three-group zoom lens of claim 1, said third lens group including a lens element having at least one aspherical surface.

3. The three-group zoom lens of claim 1, wherein the following condition is satisfied:

$$-0.75 < R_{G21}/fw < -0.20$$

where $R_{G21}$ is the radius of curvature of the lens element surface of the second lens group that is nearest the object side; and fw is the focal length of the three-group zoom lens at the wide-angle end.

4. The three-group zoom lens of claim 2, wherein the following condition is satisfied:

$$-0.75 < R_{G21}/fw < -0.20$$

where $R_{G21}$ is the radius of curvature of the lens element surface of the second lens group that is nearest the object side; and fw is the focal length of the three-group zoom lens at the wide-angle end.

* * * * *